United States Patent
Mundra et al.

(10) Patent No.: US 12,481,449 B2
(45) Date of Patent: *Nov. 25, 2025

(54) EFFICIENT BACKUP AFTER A RESTORE OPERATION

(71) Applicant: Cohesity, Inc., San Jose, CA (US)

(72) Inventors: Shreshtha Mundra, San Jose, CA (US); Anand Arun, San Jose, CA (US); Shubham Parashram Sawant, Pune (IN); Yinzen Hwang, Newark, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,389

(22) Filed: Jul. 12, 2024

(65) Prior Publication Data

US 2024/0370194 A1    Nov. 7, 2024

Related U.S. Application Data

(63) Continuation of application No. 18/323,119, filed on May 24, 2023, now Pat. No. 12,061,813, which is a continuation of application No. 17/097,964, filed on Nov. 13, 2020, now Pat. No. 11,698,743.

(51) Int. Cl.
*G06F 3/06* (2006.01)

(52) U.S. Cl.
CPC ............ *G06F 3/065* (2013.01); *G06F 3/0619* (2013.01); *G06F 3/0664* (2013.01); *G06F 3/0673* (2013.01)

(58) Field of Classification Search
CPC ...... G06F 3/065; G06F 3/0619; G06F 3/0664; G06F 3/0673
See application file for complete search history.

(56) References Cited

U.S. PATENT DOCUMENTS

| | | |
|---|---|---|
| 6,594,744 B1 | 7/2003 | Humlicek |
| 9,235,535 B1 | 1/2016 | Shim |
| 10,402,283 B1 | 9/2019 | Chen |
| 11,086,545 B1 | 8/2021 | Dayal |
| 11,698,743 B2 | 7/2023 | Mundra et al. |
| 2005/0055603 A1 | 3/2005 | Soran |
| 2011/0184912 A1 | 7/2011 | Baptist |
| 2013/0080695 A1 | 3/2013 | Beeken |
| 2017/0060699 A1 | 3/2017 | Hohl |

(Continued)

FOREIGN PATENT DOCUMENTS

EP    3451173    6/2020

OTHER PUBLICATIONS

"Microsoft Corporation", Microsoft Computer Dictionary, Microsoft Press, 5th Edition, Jan. 2002, 97, 264, 487 pp.

(Continued)

*Primary Examiner* — Eric T Loonan
(74) *Attorney, Agent, or Firm* — Shumaker & Sieffert, P.A.

(57) ABSTRACT

A request to restore a specific backup instance is received. In response to the received request to restore the specific backup instance, a new reference backup instance based on the specific backup instance stored at the storage controlled by the backup system is created at a storage controlled by a backup system. Data associated with the specific backup instance is provided to a recipient system from the storage associated with a backup system. A constructive incremental backup snapshot of the recipient system is performed based on the new reference backup instance.

20 Claims, 12 Drawing Sheets

(56) References Cited

U.S. PATENT DOCUMENTS

2019/0065322 A1 2/2019 Chakankar et al.
2023/0315326 A1 10/2023 Mundra et al.

OTHER PUBLICATIONS

International Preliminary Report on Patentability from International Application No. PCT/US2021/058805 dated May 16, 2023, 12 pp.
International Search Report and Written Opinion of International Application No. PCT/US2021/058805 dated Feb. 23, 2022, 15 pp.
Prosecution History from U.S. Appl. No. 17/097,964, now issued U.S. Pat. No. 11,698,743, dated Jul. 2, 2021 through Jun. 7, 2023, 110 pp.
Prosecution History from U.S. Appl. No. 18/323,119, dated Dec. 20, 2023 through Apr. 10, 2024, 25 pp.

EFFICIENT BACKUP AFTER A RESTORE OPERATION

CROSS REFERENCE TO OTHER APPLICATIONS

This application is a continuation of U.S. patent application Ser. No. 18/323,119, filed May 24, 2023, now U.S. Pat. No. 12,061,813, which is a continuation of U.S. patent application Ser. No. 17/097,964, filed Nov. 13, 2020, now U.S. Pat. No. 11,698,743, the entire content of each application is incorporated herein by reference.

BACKGROUND

A restore target may perform a backup snapshot of its file system data to a backup system. The file system data may include data associated with one or more objects and metadata associated with the one or more objects. The object may correspond to a file, a database, a virtual machine, an application, a volume, etc. At some point in time, the restore target may need to be restored to a particular point in time. The backup system may receive a request to restore to the restore target an object corresponding to the particular point in time. In response to the request, the backup system may restore the object to the restore target.

BRIEF DESCRIPTION OF THE DRAWINGS

Various embodiments of the invention are disclosed in the following detailed description and the accompanying drawings.

DETAILED DESCRIPTION

Figure 1:
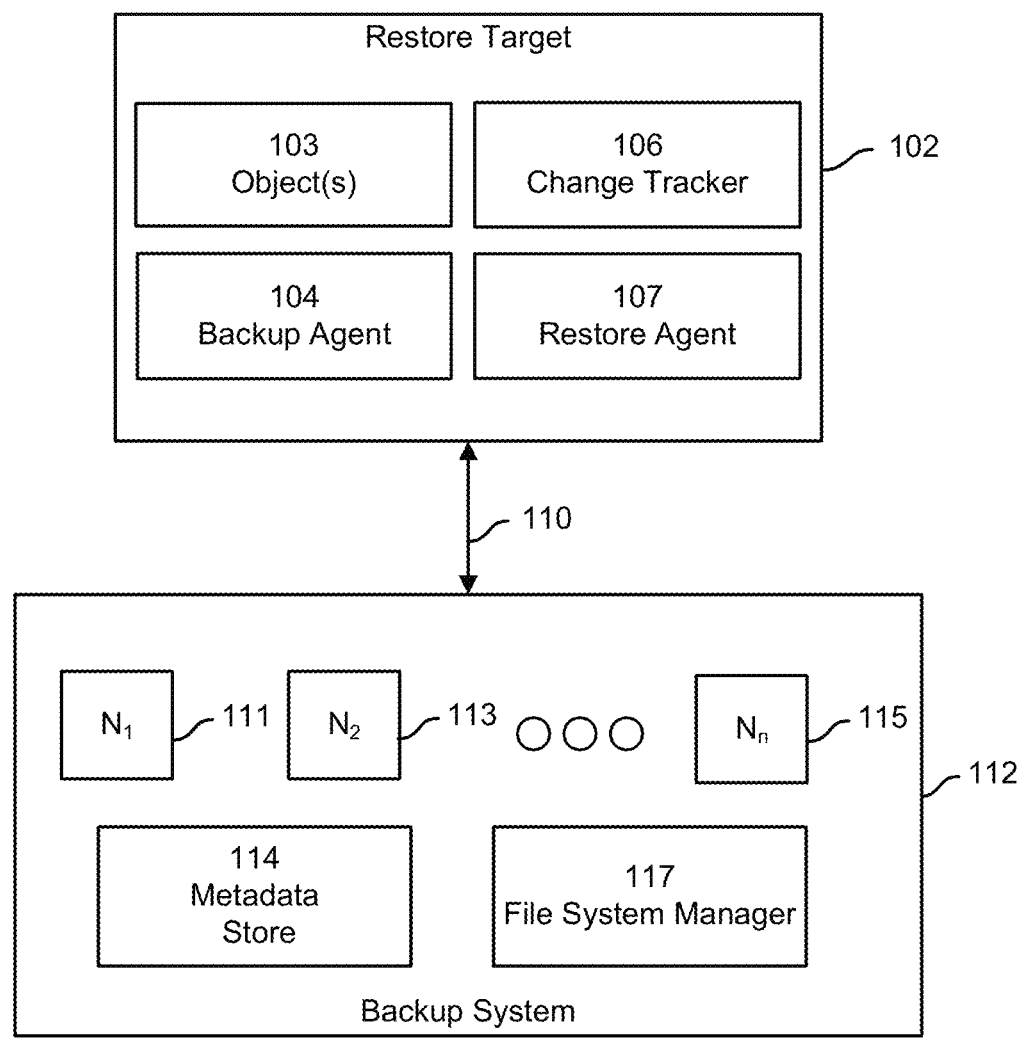
FIG. 1 is a block diagram illustrating an embodiment of a system for performing an efficient backup after a restore operation in accordance with some embodiments.

A technique to perform an efficient backup after a restore operation is disclosed herein. A restore target may perform a backup snapshot of its file system data according to a backup policy. The backup policy may indicate that a backup snapshot (e.g., full backup snapshot or incremental backup snapshot) is to be performed periodically (e.g., hourly, daily, weekly, monthly, etc.), after a threshold amount of data has changed, in response to a user command, etc.

In some embodiments, the full backup snapshot includes all of the file system data associated with the restore target. In some embodiments, the full backup snapshot includes all of the file system data associated with one of the objects (e.g., a VM) hosted on the restore target. In some embodiments, the full backup snapshot includes all of the file system data associated with some of the objects (e.g., a VM and a database). In some embodiments, the incremental backup snapshot includes all of the file system data associated with the restore target that has not been backed up since a previous backup snapshot. In some embodiments, the incremental backup snapshot includes all of the file system data associated with one of the objects (e.g., a VM) that has not been backed up since a previous backup snapshot. In some embodiments, the full backup snapshot includes all of the file system data associated with some of the objects (e.g., a VM and a database) that have not been backed up since a previous backup snapshot.

The backup system may receive the file system data included in a backup snapshot and generate a corresponding view of file system data. The corresponding view of file system data represents a state of the restore target for a particular point in time at which the backup snapshot was performed. In some embodiments, the corresponding view of file system data represents a state of the entire restore target. In some embodiments, the corresponding view of file system data represents a state of an object hosted on the restore target. In some embodiments, the corresponding view of file system data represents corresponding states of some objects hosted on the restore target.

The view of file system data generated by the backup system includes metadata that enables data chunks associated with backed up object(s) to be located. The metadata may include one or more tree data structures that organize the data chunks associated with the backed up object(s). An example of the tree data structure is a snapshot tree, as described herein, which may be based on a B+ tree structure (or other type of tree structure in other embodiments). The tree data structure may be used to capture different views of file system data. A first view may correspond to a first backup snapshot, a second view may correspond to a second backup snapshot, . . . , and an nth view may correspond to an nth backup snapshot. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

At some point in time, the restore target may become corrupted and need to be restored to a particular point in time. For example, a volume of the restore target may become corrupted. The backup system may receive a request to restore a specific backup instance. In some embodiments, the request is to restore the entire restore target to a particular point in time for which there is an associated backup snapshot. In some embodiments, the request is to restore an object to the particular point in time for which there is an associated backup snapshot. For example, the request may be to restore a particular version of a VM to the restore target.

In response to the request to restore the specific backup instance, the backup system may create at a storage associated with the backup system a new reference backup instance based on the specific backup instance stored at the storage associated with the backup system. The new reference backup instance may be created by cloning a root node of a snapshot tree associated with the specific backup instance. Cloning the root node of the snapshot tree associated with the specific backup instance may add an additional view to the chain of snapshot trees included in the tree data structure. The data associated with the backup instance is provided to the restore target. In some embodiments, the data associated with the view corresponding to the specific backup instance is provided to the restore target. In some embodiments, the data associated with the cloned view corresponding to the specific backup instance is provided to the restore target.

In response to receiving the data associated with the backup instance, the restore target may store in one or more storage volumes the data associated with the backup instance to restore the restore target to the particular point in time. In some embodiments, a differential restore is performed. A differential restore may include modifying and overwriting the disks, such as the disks of a VM, using the data associated with the backup instance. For example, the restore target may already store some of the backup instance data for the particular point in time. The differential restore may include data not stored by the restore target that is required to modify the restore target into a state that corresponds to the particular point in time. The backup system may provide the restore target the data not stored by the restore target that is required to modify the restore target into a state that corresponds to the particular point in time. In some embodiments, a non-differential restore is performed. A non-differential restore may include creating a new VM using the data associated with the backup instance. The non-differential restore may include all of the data associated with the backup instance that corresponds to the particular point in time. The backup system may provide the restore target all of the data that is required to restore the restore target to a state that corresponds to the particular point in time.

In some embodiments, in response to receiving the data associated with the backup instance, the restore target is configured to modify object metadata associated with the specific backup instance. For example, a virtual machine name may be modified, attributes associated with one or more objects may be customized, one or more tags may be applied to a virtual machine, permissions, etc.

The data associated with the backup instance is in a locked state on the restore target (e.g., locked from users associated with the restore target) while it is being restored to the restore target. The restore target may include a change tracker. A change tracker may be configured to track the changes (e.g., changed data blocks) that have occurred since a checkpoint, which may correspond to a previous backup snapshot. The previous backup snapshot is associated with a corresponding tracking identifier (ID). A backup agent may be configured to use the tracking ID associated with the previous backup snapshot to determine which data to include in an incremental backup snapshot.

The backup system may send to the restore target a command to create a new tracking ID (e.g., a checkpoint). In response to the command, the change tracker may create the new tracking ID and send the new tracking ID to the backup system. The new tracking ID indicates a checkpoint from which a constructive incremental backup snapshot is to be performed. After the change tracker creates the new tracking ID, the restore target may set the restored backup instance to a mutable state. A tracking ID created after data is restored can be used to create a constructive incremental backup that captures changes made since the restore target was restored and excludes other changes, such as changes made after the last backup snapshot and before the restore target was restored.

The restore target may perform a backup snapshot after the data associated with the backup instance is restored. In some embodiments, the restore target may perform the backup snapshot according to a schedule (e.g., everyday at 12 am). The restore target may be configured to perform the backup snapshot based on a last created tracking ID. In some embodiments, the backup system sends to the restore target a request to perform the backup snapshot based on the new tracking ID.

Other systems may perform a full backup snapshot of its file system data after the object has been restored. This is an inefficient use of time and resources because the backup system already stores most of the file system data that is to be included in the full backup snapshot, additional network bandwidth between the restore target and the backup system will be consumed to transmit data that is already stored by the backup system, and to perform the full backup snapshot the restore target is required to use its resources (e.g., CPU resources) that could be used for other purposes. Other systems may perform an incremental backup snapshot of its file system data after the object has been restored (e.g., an incremental backup snapshot that includes changes to the restore target since the tracking ID associated with the previous backup snapshot). However, these other systems may be configured to perform an incremental backup snapshot of file system data that has changed since a previous backup snapshot, which occurred before the object was restored. The differences between the previous backup snapshot and the restored object may cause the amount of data included in the incremental backup snapshot to be large, which is an inefficient use of time and resources because these other systems are backing up to the backup system data that may not need to be backed up. Also, to perform the incremental backup snapshot the backup system is required to use its resources (e.g., CPU resources) that could be used for other purposes.

Using the efficient backup after a restore operation technique disclosed herein, instead of performing an incremental backup snapshot by sending to the backup system the data that has changed since a previous backup snapshot, the restore target may perform a constructive incremental backup snapshot by sending to the backup system the data that has changed since the new tracking ID was created. This is an efficient backup after a restore operation because the amount of data that is backed up to the backup system is limited to the data that has changed since the restore operation. Furthermore, a full backup snapshot of the restore target does not need to be performed after the restore operation because the backup system already stores most of the data that is to be included in the full backup snapshot of the restore target. Thus, the amount of resources needed by the restore target to perform a backup snapshot after a restore operation is reduced.

The backup system may receive from the restore target the file system data associated with the constructive incremental backup snapshot. To generate a view of file system data that represents a state of the restore target for a particular point in time at which the constructive incremental backup snapshot was performed, the backup system may clone a root node of the tree data structure that corresponds to a new reference backup instance and modify the tree data structure in a manner as described herein to reflect the state of the restore target for the particular point in time at which the constructive incremental backup snapshot was performed.

FIG. 1 is a block diagram illustrating an embodiment of a system for performing an efficient backup after a restore operation in accordance with some embodiments. In the example shown, system 100 includes restore target 102 and backup system 112. Restore target 102 is coupled to backup system 112 via connection 110. Connection 110 may be a wired or wireless connection. Connections 110 may communicate data and/or information via a local area network, a wide area network, a storage area network, campus area network, metropolitan area network, system area network, intranet, the Internet, and/or a combination thereof. In some embodiments, each of the nodes 111, 113, 115 includes a corresponding connection to backup agent 104 and/or restore agent 107. In some embodiments, backup agent 104 and restore agent 107 are combined as a single agent.

Restore target 102 is a computing system that stores file system data. The file system data may include data associated with one or more objects (e.g., content files, text files, database file, database, virtual machine, a container, an application, etc.) and metadata associated with the one or more objects (e.g., creation time, owner, modification time, file size, etc.) (also referred to herein as "object metadata"). The file system data is stored in one or more storage volumes (not shown). Restore target 102 may be comprised of one or more servers, one or more computing devices, one or more storage devices, and/or a combination thereof. Restore target 102 may be configured to send a backup snapshot of file system data to backup system 112 according to one or more backup snapshot policies. In some embodiments, a backup snapshot policy indicates that file system data is to be backed up on a periodic basis (e.g., hourly, daily, weekly, monthly, etc.), when a threshold size of data has changed, in response to a command from a user associated with restore target 102, etc.

Backup agent 104 may be configured to cause restore target 102 to perform a backup snapshot (e.g., a full backup snapshot, incremental backup snapshot, or a constructive incremental backup snapshot). A full backup snapshot may include all of the file system data of restore target 102 at a particular moment in time. In some embodiments, a full backup snapshot for a particular object of the one or more objects 103 is performed and the full backup snapshot of the particular object includes all of the data (e.g., content data of an object, object metadata) associated with the particular object at a particular moment in time. An incremental backup snapshot may include all of the data of restore target 102 that was not included in a previous backup snapshot. In some embodiments, an incremental backup snapshot for a particular object of the one or more objects 103 is performed and the incremental backup snapshot of the particular object includes all of the data associated with the particular object that was not included in a previous backup snapshot. The incremental backup snapshot may be performed based on a tracking ID associated with the previous backup snapshot, e.g., the incremental backup snapshot includes changes to file system data that occurred after the previous backup snapshot.

In some embodiments, backup agent 104 is running on restore target 102. In some embodiments, backup agent 104 is running in one of the one or more objects. In some embodiments, a first backup agent 104 is running on restore target 102 and a separate backup agent 104 is running in one of the one or more objects 103. In some embodiments, an object includes a backup function and is configured to perform a backup snapshot on its own without backup agent 104. In some embodiments, restore target 102 includes a backup function and is configured to perform a backup snapshot on its own without backup agent 104. In some embodiments, backup system 112 may provide instructions to restore target 102, causing restore target 102 to execute backup functions without backup agent 104.

Backup system 112 is comprised of a storage cluster that includes a plurality of nodes 111, 113, 115. Although three nodes are shown, backup system 112 may be comprised of n nodes. In some embodiments, a node includes a processor and memory, and is coupled to a separate storage device. The separate storage device may include one or more storage devices (e.g., flash storage devices). A storage device may be segmented into a plurality of partitions. In some embodiments, one of the partitions is configured to store all of the backup system 112 generated metadata (e.g., snapshot trees, object metadata structures) included in metadata store 114. In some embodiments, a partition is configured to store some of the metadata store 114 and the backup system 112 generated metadata included in metadata store 114 is stored in a plurality of partitions. A node may be allocated one of the partitions that stores some of metadata store 114. Each of the nodes 111, 113, 115 may be allocated one or more of the partitions. The one or more partitions allocated to a node may be configured to store data associated with some or all of the plurality of objects that were backed up to backup system 112. For example, the separate storage device may be segmented into 10 partitions and storage device 112 may include 10 nodes. A node of the 10 nodes may be allocated one of the 10 partitions.

In some embodiments, a node includes a processor, memory, and a storage device. The storage device may be configured to store metadata associated with a plurality of objects that were backed up to backup system 112, such as part or all of metadata store 114. For example, the metadata associated with the plurality of objects may include backup system 112 generated metadata (e.g., metadata that enables the data associated with the object to be located). The node may be coupled to a separate storage device. The separate storage device may include one or more storage devices. A storage device may be segmented into a plurality of partitions. Each of the nodes 111, 113, 115 may be allocated one or more of the partitions. The one or more partitions allocated to a node may be configured to store data associated with some or all of the plurality of objects that were backed up to backup system 112. For example, the separate storage device may be segmented into 10 partitions and storage device 112 may include 10 nodes. A node of the 10 nodes may be allocated one of the 10 partitions.

In some embodiments, a node includes a processor, memory, and one or more storage devices. A first storage device may be configured to store metadata associated with a plurality of objects that were backed up to backup system 112, such as part or all of metadata store 114. For example, the metadata associated with the plurality of objects may include backup system 112 generated metadata. A second storage device may be configured to store data associated with the plurality of objects that were backed up to backup system 112. The plurality of storage devices may include one or more solid state drives, one or more hard disk drives, or a combination thereof.

Backup system 112 may be a cloud instantiation of a backup system. A configuration of a cloud instantiation of backup system 112 may be a virtual replica of backup system 112. For example, backup system 112 may be comprised of three storage nodes, each storage node with a storage capacity of 10 TB. A cloud instantiation of backup system 112 may be comprised of three virtual nodes, each virtual node with a storage capacity of 10 TB. In other embodiments, a cloud instantiation of backup system 112 may have more storage capacity than an on-premises instantiation of backup system 112. In other embodiments, a cloud instantiation of backup system 112 may have less storage capacity than an on-premises instantiation of backup system 112.

Backup system 112 may be configured to ingest a backup snapshot received from restore target 102 and configured to store the data associated with the backup snapshot in storage associated with the nodes 111, 113, 115. Backup system 112 may receive and ingest the file system data associated with a backup snapshot. Backup system 112 may include a file system manager 117 that is configured to organize the file system data of the backup snapshot using an index. The index may be a tree data structure. An example of the tree data structure is a snapshot tree, which may be based on a B+ tree structure (or other type of tree structure in other embodiments). Backup system 112 may store a plurality of tree data structures in metadata store 114. Backup system 112 may generate a snapshot tree and one or more object metadata structures for each backup snapshot.

In the event the backup snapshot corresponds to a full backup of restore target 102, a view corresponding to the backup snapshot may be comprised of a snapshot tree and one or more object metadata structures. The snapshot tree may be configured to store the file system metadata associated with restore target 102. An object metadata structure may be configured to store the metadata associated with one of the objects stored on restore target 102. Each of the objects included in a backup snapshot may have a corresponding object metadata structure.

In the event the backup snapshot corresponds to a full backup of one of the one or more objects 103, such as a virtual machine, a view corresponding to the backup snapshot may be comprised of a snapshot tree and one or more object metadata structures. The snapshot tree may be configured to store the metadata associated with one of the one or more objects 103. An object metadata structure may be configured to store the metadata associated with a file included in the object, such as a file included in a virtual machine.

The tree data structure may be used to capture different views of data. A view of data may correspond to a full backup snapshot, an incremental backup snapshot, a constructive incremental backup snapshot, a clone of data, a file, etc. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

A snapshot tree is a representation of a fully hydrated restoration point because it provides a complete view of a restore target, an object, or data generated on or by the backup system at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, backup system 112 maintains fully hydrated restoration points. Any file associated with restore target 102, an object at a particular time and the object's contents, or a file generated on or by the backup system, for which there is an associated reference restoration point, may be determined from the snapshot tree, regardless if the associated reference restoration was a full reference restoration point or an incremental reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size (e.g., 256 kb), an identifier of a data brick, a pointer to a metadata structure (e.g., object metadata structure), a pointer to a data chunk stored on the storage cluster, etc.

An object metadata structure may include a root node, one or more levels of one or more intermediate nodes associated with the root node, and one or more leaf nodes associated with an intermediate node of the lowest intermediate level. The tree data structure associated with an object metadata structure allows a chain of object metadata structures corresponding to different versions of an object, an object file, or a file to be linked together by allowing a node of a later version of an object metadata structure to reference a node of a previous version of an object metadata structure. Each root node of the tree data structure may be associated with a different instance (e.g., version) of an object. The object metadata structure is configured to store metadata associated with an object that enables the data chunks associated with the object to be located.

A leaf node of an object metadata structure may store a value, such as an identifier of a data brick associated with one or more data chunks. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier.

A chunk file having the identified chunk file identifier is comprised of a plurality of data chunks. An object to which the chunk file is associated is comprised of a plurality of chunk files. In some embodiments, a chunk file is stored in a storage associated with one of the nodes 111, 113, 115. In some embodiments, a chunk file is stored across corresponding storages associated with the nodes 111, 113, 115. The chunk file metadata table may be used to identify a location of the plurality of data chunks. The chunk file metadata table may include offset information of the plurality of data chunks within a chunk file. The first or second data structure may indicate a node of the storage cluster that is associated with storage that stores a data chunk or a chunk file. Each of the nodes 111, 113, 115 may be associated with corresponding storage that stores a corresponding version of metadata store 114.

At some point in time, restore target 102 may go offline and need to be restored to a particular point in time. For example, a volume of the restore target may become corrupted. Backup system 112 may receive from a user associated with restore target 102 a request to restore a specific backup instance to restore target 102. In some embodiments, the request is to restore the entire restore target to a particular point in time for which there is an associated backup snapshot. In some embodiments, the request is to restore an object to the particular point in time for which there is an associated backup snapshot. For example, the request may be to restore a particular backup instance (e.g., backed up version) of a VM to the restore target.

In response to the received request to restore the specific backup instance, backup system 112 may create at a storage associated with the backup system, such as nodes 111, 113, 115, a new reference backup instance based on the specific backup instance stored at the storage associated with the backup system. The new reference backup instance may be created by cloning a root node of a snapshot tree associated with the specific backup instance. Cloning the root node of the snapshot tree associated with the specific backup instance may add an additional view to the chain of snapshot trees included in the tree data structure.

The data associated with the backup instance is provided to restore target 102. In some embodiments, the data associated with the view corresponding to the specific backup instance is provided to restore target 102. In some embodiments, the data associated with the cloned view corresponding to the specific backup instance is provided to restore target 102. In some embodiments, object metadata associated with the specific backup instance is modified after the data associated with the backup instance is provided to restore target 102. For example, a virtual machine name may be modified, attributes associated with one or more objects may be customized, one or more tags may be applied to a virtual machine, permissions may be configured, etc.

In response to receiving the data associated with the backup instance, restore agent 107 may store in one or more storage volumes the data associated with the backup instance. In some embodiments, restore agent 107 performs a differential restore. A differential restore may include modifying and overwriting disks, such as the disks of a VM, using the data associated with the backup instance. For example, restore target 102 may already store some of the backup instance data for the particular point in time. The differential restore may include data not stored by restore target 102 that is required to modify restore target 102 into a state that corresponds to the particular point in time. Backup system 112 may provide the restore target the data not stored by restore target 102 that is required to modify restore target 102 into a state that corresponds to the particular point in time.

In some embodiments, restore agent 107 performs a non-differential restore. A non-differential restore may include creating a new VM using the data associated with the backup instance. The non-differential restore may include all of the data associated with the backup instance that corresponds to the particular point in time. Backup system 112 may provide restore target 102 all of the data that is required to restore target 102 to a state that corresponds to the particular point in time.

The data associated with the backup instance is in a locked state on restore target 102 (e.g., locked from users associated with restore target 102) while it is being restored to restore target 102. Restore target 102 may include change tracker 106 (e.g., change block tracker, resilient change tracking, etc.). Change tracker 106 may be configured to track the changes (e.g., changed data blocks) that have occurred since a checkpoint, which may correspond to a previous backup snapshot. The previous backup snapshot is associated with a corresponding tracking ID. Backup agent 104 may be configured to use the tracking ID associated with the previous backup snapshot to determine which data to include in an incremental backup snapshot.

Backup system 112 may send to restore target 102 a command to create a new tracking ID. The command may be provided to change tracker 106. In response to receiving the command, change tracker 106 may create a new tracking ID and send to backup system 112 the new tracking ID. The new tracking ID indicates a checkpoint from which a constructive incremental backup snapshot should be performed. After change tracker 106 creates the new tracking ID, restore target 102 may set the restored backup instance to a mutable state. The tracking ID may have an associated timestamp. A tracking ID created after data is restored can be used to create a constructive incremental backup that captures changes made since the restore target was restored and excludes other changes, such as changes made after the last backup snapshot and before the restore target was restored.

Restore target 102 may perform a backup snapshot after the data associated with the backup instance is restored. In some embodiments, restore target 102 may perform the backup snapshot according to a schedule (e.g., everyday at 12 am). Restore target 102 may be configured to perform the backup snapshot based on a last created tracking ID. In some embodiments, backup system 112 sends to restore target 102 a request to perform the backup snapshot based on the new tracking ID. Instead of performing an incremental backup snapshot by sending to backup system 112 the data that has changed since a previous backup snapshot, restore target 102 may perform a constructive incremental backup snapshot and send to backup system 112 the data that has changed since the tracking ID was created.

This is an efficient backup after a restore operation because the amount of data that is backed up to backup system 112 is limited to the data that has changed since the restore operation. Other incremental backup snapshots may include data that has changed after the last backup snapshot and before the restore operation. Thus, the other incremental backup snapshots may include additional data that is unnecessary to backup. Furthermore, a full backup snapshot of restore target 102 does not need to be performed after the restore operation because backup system 112 already stores most of the data that is to be included in the full backup snapshot of restore target 102. Thus, the amount of resources needed by restore target 102, network bandwidth, and the amount of resources needed by backup system 112 to perform a backup snapshot after a restore operation is reduced.

Backup system 112 may receive from restore target 102 the data associated with the constructive incremental backup snapshot. To generate a view of file system data that represents a state of restore target 102 for a particular point in time at which the constructive incremental backup snapshot was performed, backup system 112 may clone a root node of the tree data structure that corresponds to the new reference backup instance and modify the tree data structure in a manner as described herein to reflect the state of restore target 102 for the particular point in time at which the constructive incremental backup snapshot was performed.

Figure 2A:
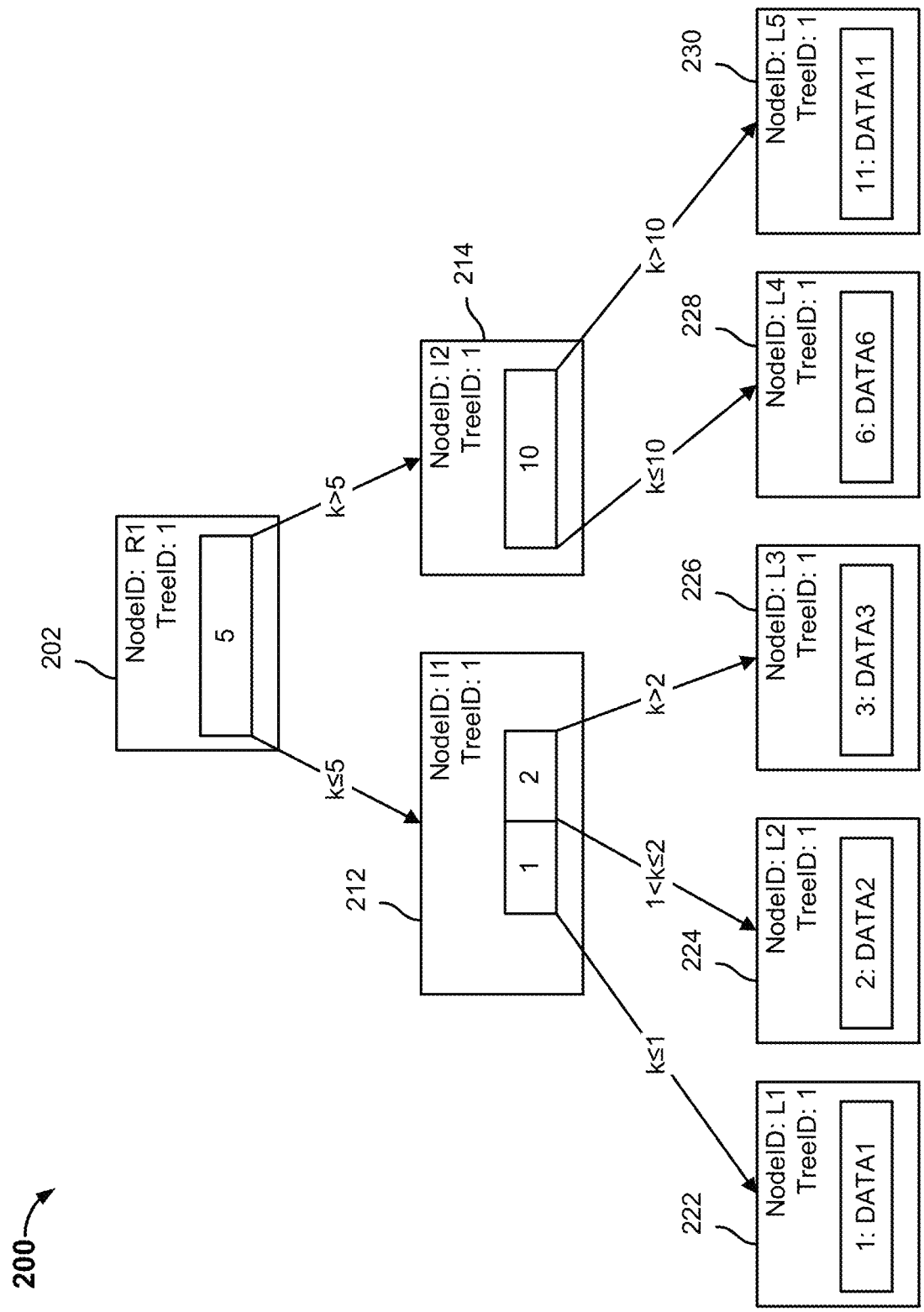
FIG. 2A is a block diagram illustrating an embodiment of a tree data structure.

FIG. 2A is a block diagram illustrating an embodiment of a tree data structure. A tree data structure may be used to represent a view of file system data that is stored on a backup system, such as backup system 112. The file system data may include metadata for a distributed file system and may include information, such as a chunk identifier, a chunk offset, file size, directory structure, file permissions, physical storage locations of the content files, inode information, etc. A file system manager, such as file system manager 117, may generate tree data structure 200. Tree data structure 200 may correspond to a full backup snapshot.

Tree data structure 200 is comprised of a snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time, for example, at time to. The backup snapshot may be received from a restore target, such as restore target 102. The snapshot tree in conjunction with a plurality of object metadata structures may provide a complete view of the restore target associated with the backup snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node of the snapshot tree at the lowest level of the snapshot tree. Each node of the tree structure includes a view identifier of a view with which the node is associated (e.g., TreeID). A leaf node may be configured to store key-value pairs of file system data. A data key k is a lookup value by which a particular leaf node may be accessed. For example, "1" is a data key that may be used to lookup "DATA1" of leaf node 222.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes pointers to intermediate node 212 and intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 212 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf nodes 222, 224, 226, 228, 230 include respective data key-value pairs of "1: DATA1," "2: DATA2," "3: DATA3," "6: DATA6," "11: DATA11." Leaf nodes 222, 224, 226, 228, 230 include respective Node IDs of "L1," "L2," "L3," "L4," "L5." Leaf nodes 222, 224, 226, 228, 230 all include a TreeID of "1." In some embodiments, leaf nodes 222, 224, 226, 228, or 230 are configured to store metadata. In other embodiments, leaf nodes 222, 224, 226, 228, or 230 are configured to store content file data when the size of the content file is less than or equal to a limit size. In other embodiments, leaf nodes 222, 224, 226, 228, or 230 are inodes and are configured to store a pointer to or an identifier of a respective object metadata structure (e.g., object metadata tree). In some embodiments, leaf nodes 222, 224, 226, 228, or 230 store a corresponding reference to a storage location of a corresponding object. In some embodiments, leaf nodes 222, 224, 226, 228, or 230 store corresponding object identifiers that are associated with corresponding objects. In some embodiments, the object identifier for an object corresponds to a particular inode id of the backup system. In some embodiments, a node of the tree data structure stores an inode id of the backup system that corresponds to the object. In some embodiments, the object identifier for the object is a file path. In some embodiments, a node of the tree data structure stores a file path that corresponds to the object.

Figure 2B:
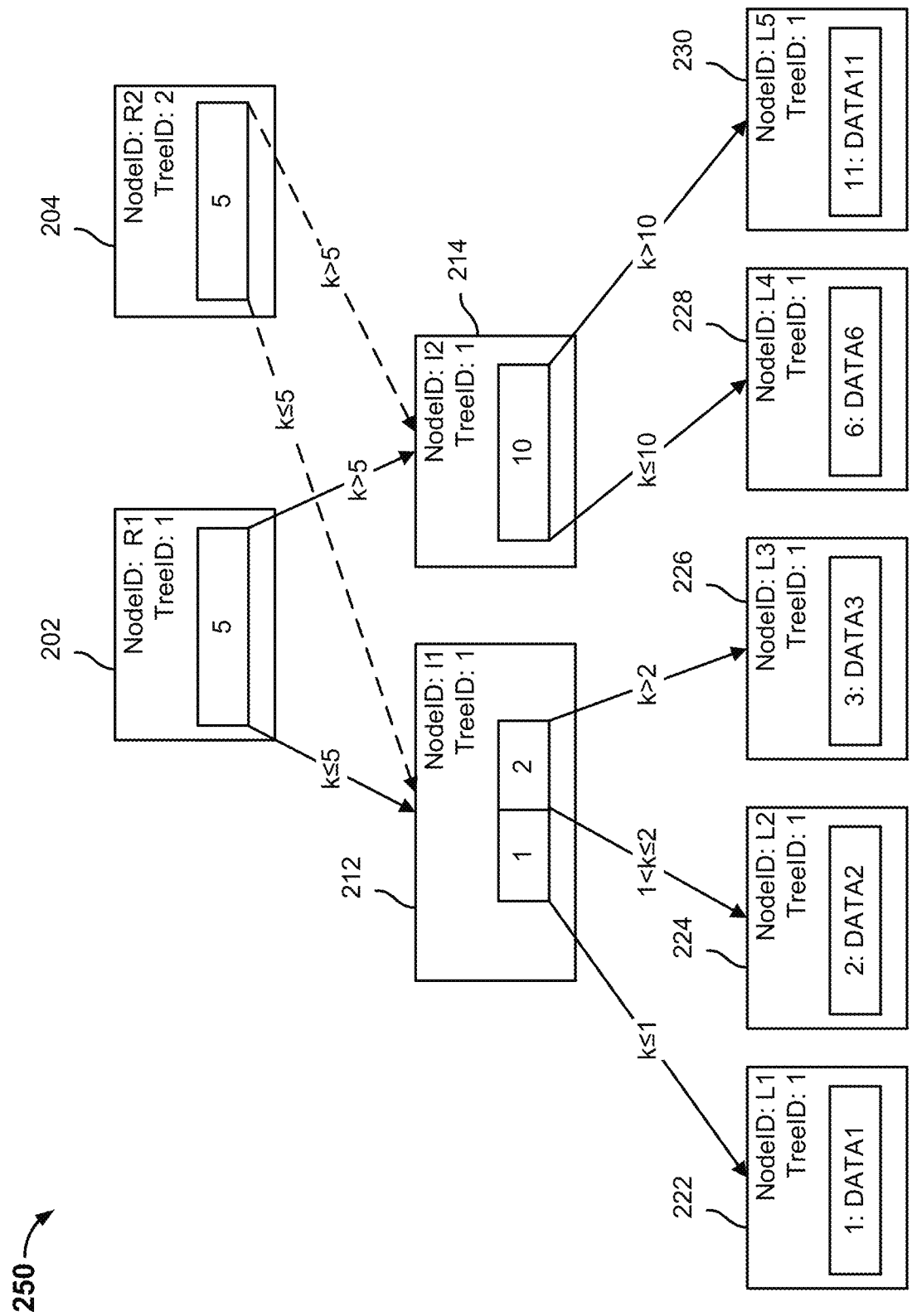
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure (e.g., when a specific backup instance is requested to be restored, when data associated with a snapshot tree is migrated, when data associated with a snapshot tree is replicated, when data associated with a snapshot tree is used for test/development purposes, etc.). In some embodiments, tree data structure 250 may be created by a backup system, such as backup system 112.

The file system data of a restore target, such as restore target 102, may be backed up to a backup system, such as backup system 112. A subsequent backup snapshot may correspond to an incremental backup snapshot or a constructive incremental backup snapshot. The tree data structure corresponding to the subsequent backup snapshot is generated in part by cloning a snapshot tree associated with a previous backup snapshot.

When performing a restore operation, a new reference backup instance is generated by cloning a root node associated with a specifically requested backup instance. In the example shown, root node 202 corresponds to a root node associated with the specific requested backup instance. To restore the data associated with a snapshot tree having root node 202, a new reference backup instance is generated by cloning root node 202 into root node 204.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a snapshot tree included in the tree data structure. In some embodiments, the tree data structure allows a chain of backup snapshot versions (i.e., file system metadata snapshot forest) to be linked together by allowing a node of a later version of a snapshot tree to reference a node of a previous version of a snapshot tree. For example, a snapshot tree with root node 204 is linked to a snapshot tree with root node 202. Each time a backup snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID.

In some embodiments, a root node is associated with a current view of the file system data. A current view may still accept one or more changes to the data. In the example shown, root node 204 is associated with a current view of the file system data. In other embodiments, a root node is associated with a snapshot view of the file system data. A snapshot view may represent a state of the file system data at a particular moment in time in the past and is not updated. In the example shown, root node 202 is associated with a snapshot view of the file system data.

To generate a snapshot tree corresponding to an incremental backup snapshot or a constructive incremental backup snapshot at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
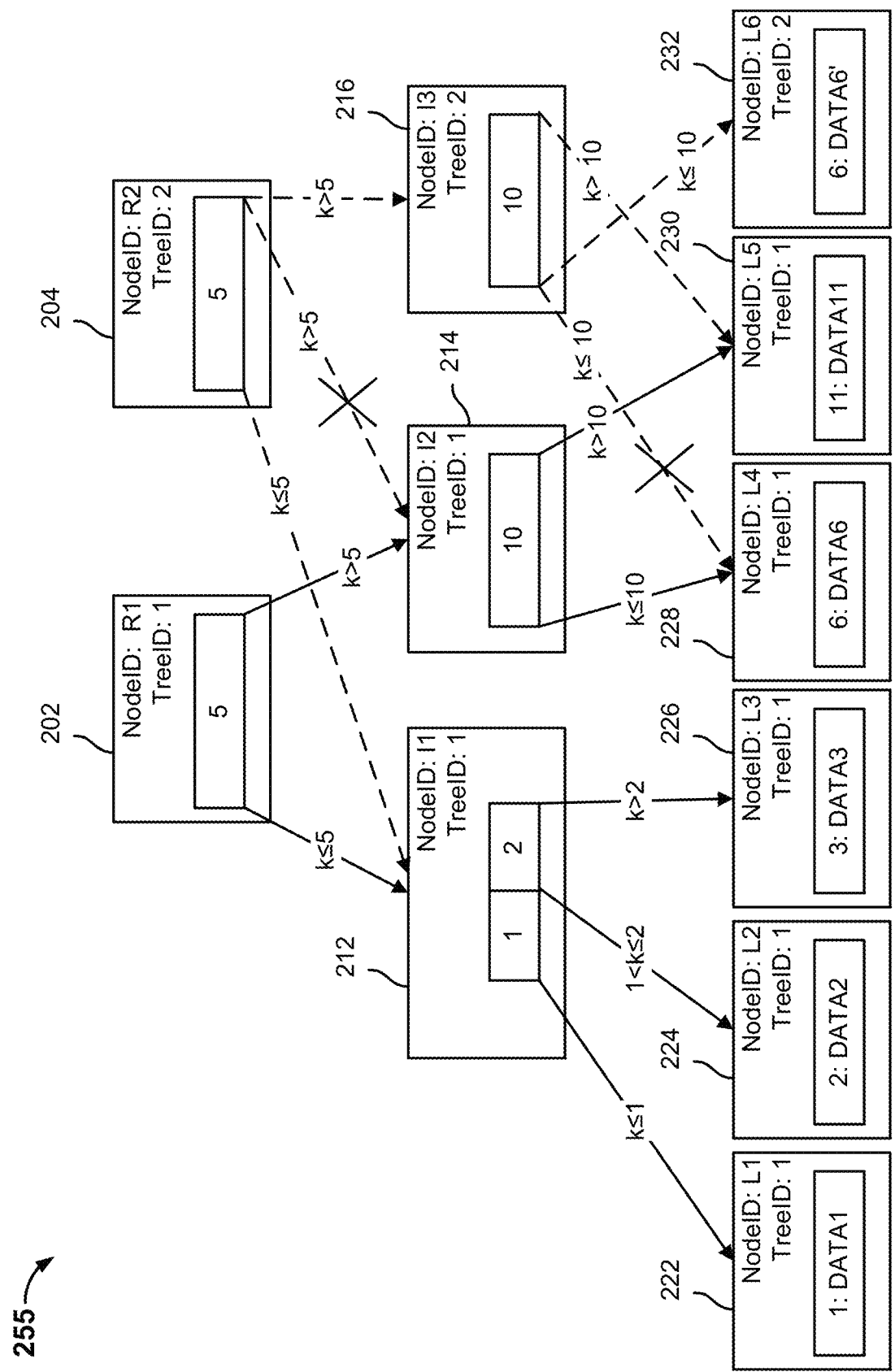
FIG. 2C is a block diagram illustrating an embodiment of modifying a cloned snapshot tree.

FIG. 2C is a block diagram illustrating an embodiment of modifying a cloned snapshot tree. In the example shown, tree data structure 255 may be modified by a file system manager, such as file system manager 117. A snapshot tree with a root node 204 may be a current view of the file system data, for example, at time $t_1$. A cloned snapshot tree may be modified to reflect the change data associated with an incremental backup snapshot or a constructive incremental backup snapshot.

In the example shown, the value "DATA6" has been modified to be "DATA6'." In some embodiments, the value of a key value pair has been modified. In other embodiments, the value of the key value pair is the file data associated with a content file that is smaller than or equal to a limit size. In other embodiments, the value of the key value pair points to a different metadata structure (e.g., a metadata structure corresponding to a different version of an object). The different metadata structure may be a modified version of the metadata structure to which the leaf node previously pointed. In some embodiments, the value of the key value pair no longer points to another node to which the node pointed.

To modify the snapshot tree at $t_1$, the file system manager starts at root node 204 because that is the root node associated with the snapshot tree at time $t_1$. The value "DATA6'" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made.

A shadow copy of a node is performed when the node is included in a plurality of snapshot trees (e.g., the snapshot tree with root node 202 and the snapshot tree with root node 204) and a value stored by the node has been updated between backup snapshots. The value stored by a node that is associated with a snapshot tree that corresponds to a previous backup snapshot is immutable. The shadow copy of the node enables a value stored by a node to be updated because the shadow copy of the node is not shared with one or more snapshot trees that correspond to one or more previous backup snapshots, rather, the shadow copy of the node is associated with the snapshot tree that corresponds to the incremental backup snapshot (a latest backup snapshot) or a constructive incremental backup snapshot.

A shadow copy may be a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228, i.e., a shadow copy. Leaf node copy 232 stores the modified value "DATA6'" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In other embodiments, leaf node 232 stores the modified data associated with a content file that is smaller than or equal to a limit size.

Nodes that correspond to new data may be added to tree data structure 255. Those nodes include a view identifier that corresponds to the view identifier of the snapshot tree with root node 204. For example, a leaf node may store new data and include a view identifier of "2." Intermediate node 216 may include a pointer to the new node.

Figure 2D:
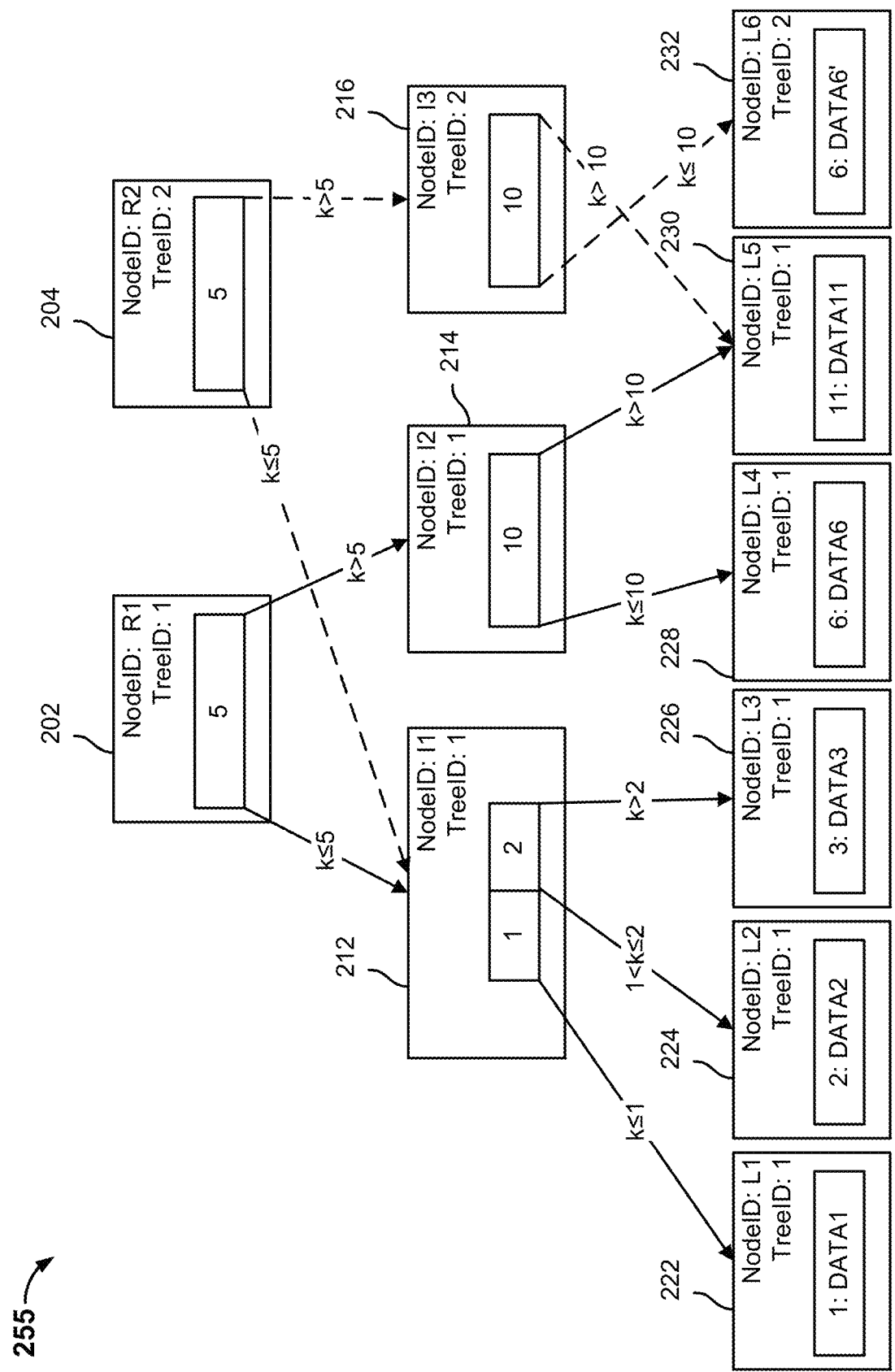
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 3A:
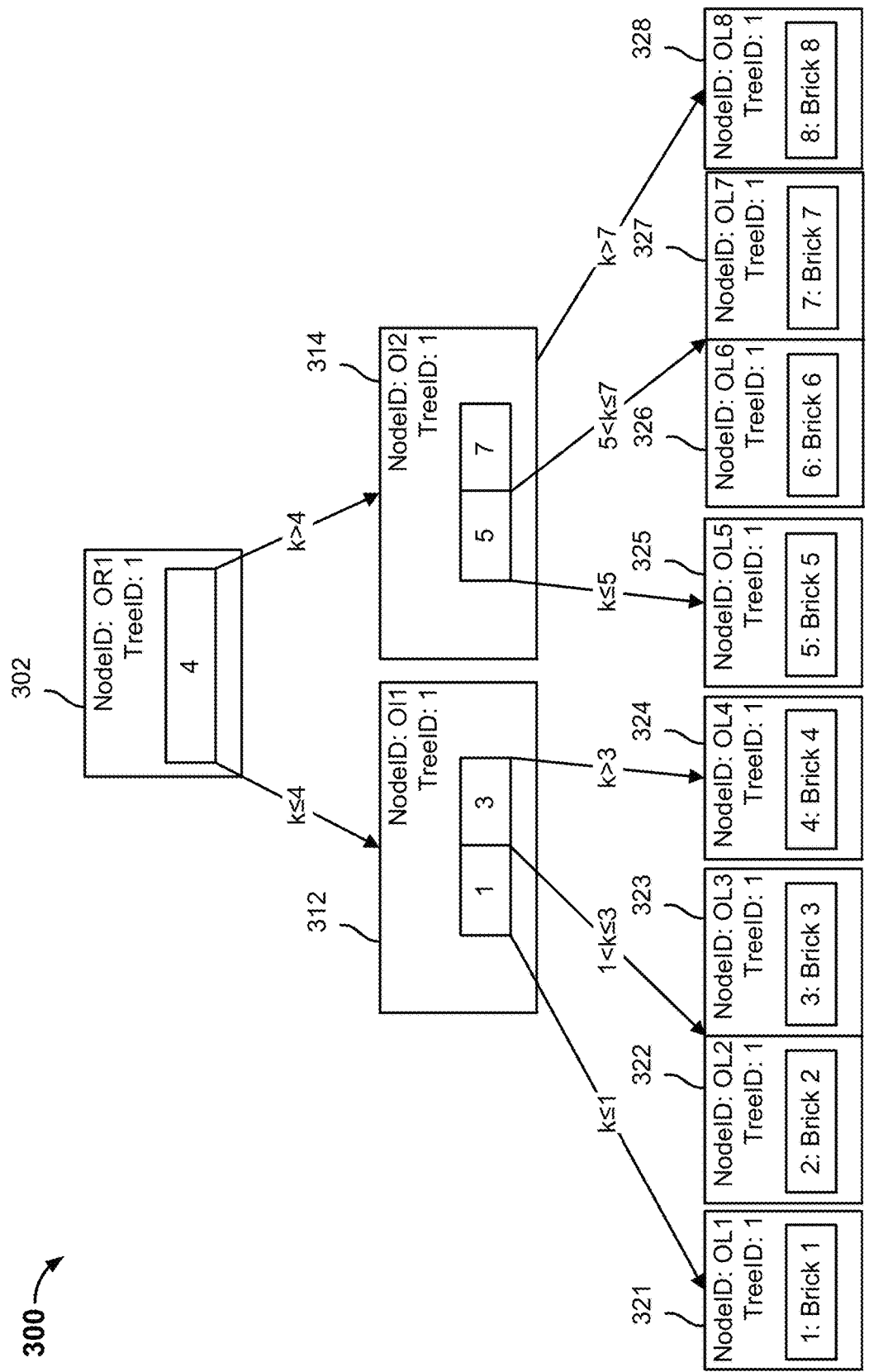
FIG. 3A is a block diagram illustrating an embodiment of a tree data structure.

FIG. 3A is a block diagram illustrating an embodiment of a tree data structure. In some embodiments, tree data structure 300 may be created by a backup system, such as backup system 112. Tree data structure 300 may be used to store the metadata associated with an object that enables the data associated with the object to be located. In the example shown, tree data structure 300 corresponds to an object and stores the metadata associated with the object that enables the data associated with the object to be located. The metadata associated with an object that enables the data associated with the object to be located may be stored by a backup system separate from the contents of the object, that is, the tree data structure storing the metadata associated with an object that enables the data associated with the object to be located is stored separately from the contents of the object. For example, the contents of the object may be stored on a hard disk drive, while tree data structure 300 that holds the object metadata may be stored in storage with faster access times, such as a solid state drive (SSD) of a storage node.

A leaf node of a snapshot tree associated with file system data, such as a leaf node of tree data structures 200, 250, 255, may include a pointer to a tree data structure (e.g., the root node of the tree data structure) that stores metadata corresponding to an object that enables the data associated with the object to be located, such as tree data structure 300. A tree data structure corresponding to an object and storing the metadata associated with the object is a snapshot tree, but is used to organize the data chunks associated with an object that are stored on the backup system. An object metadata structure may be referred to as an object metadata tree.

A tree data structure corresponding to an object at a particular point in time (e.g., a particular version) may be comprised of a root node, one or more levels of one or more intermediate nodes, and one or more leaf nodes. In some embodiments, a tree data structure corresponding to an object is comprised of a root node and one or more leaf nodes without any intermediate nodes. Tree data structure 300 may be a snapshot of an object at a particular point in time t, for example at time to. Tree data structure 300 may correspond to a full backup of an object.

In the example shown, tree data structure 300 includes object root node 302, object intermediate nodes 312, 314, and object leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the content file). Root node 302 includes pointers to intermediate nodes 312, 314. Root node 302 includes a NodeID of "OR1" and a TreeID of "1."

In the example shown, intermediate node 312 includes respective pointers to leaf nodes 321, 322, 323, 324. Intermediate node 312 includes a NodeID of "OI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "OI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf nodes 321, 322, 323, 324, 325, 326, 327, 328 include respective data key-value pairs of "1: Brick 1," "2: Brick 2," "3: Brick 3," "4: Brick 4," "5: Brick 5," "6: Brick 6," "7: Brick 7," and "8: Brick 8." "Brick 1," "Brick 2," "Brick 3," "Brick 4," "Brick 5," "Brick 6," "Brick 7," and "Brick 8" are brick identifiers that identify a data brick that is associated with one or more data chunks of an object corresponding to tree data structure 300. Leaf nodes 321, 322, 323, 324, 325, 326, 327, 328 each include a TreeID of "1." Leaf node 321 includes a NodeID of "OL1," leaf node 322 includes a NodeID of "OL2," leaf node 323 includes a NodeID of "OL3," leaf node 324 includes a NodeID of "OL4," leaf node 325 includes a NodeID of "OL5," leaf node 326 includes a NodeID of "OL6," leaf node 327 includes a NodeID of "OL7," and leaf node 328 includes a NodeID of "OL8."

An object is comprised of a plurality of data chunks. A brick may be associated with one or more data chunks. In the example shown, leaf nodes 321, 322, 323, 324, 325, 326, 327, 328 each store a corresponding brick identifier. A metadata store, such as metadata store 114, may include one or more data structures that associate a brick identifier with one or more corresponding chunk identifiers and a corresponding location (physical location) of the one or more data chunks associated with the one or more corresponding chunk identifiers. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure.

The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 3B:
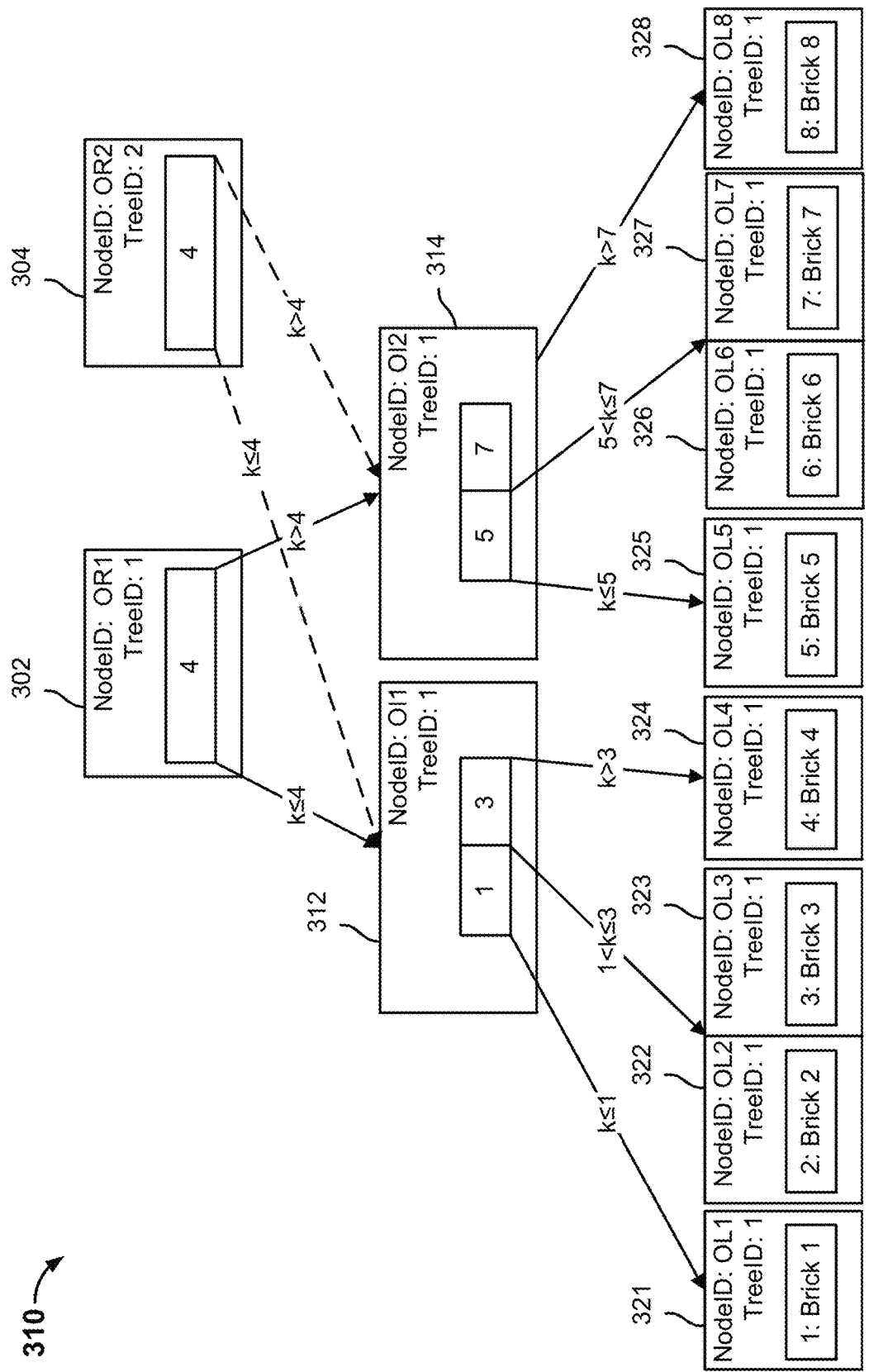
FIG. 3B is a block diagram illustrating an embodiment of a cloned object metadata structure.

FIG. 3B is a block diagram illustrating an embodiment of a cloned object metadata structure. An object metadata structure may be cloned when a subsequent version of an object is stored on a backup system, for example when an incremental backup snapshot or a constructive incremental backup snapshot is performed. In some embodiments, tree data structure 310 may be created by a backup system, such as backup system 112. In the example shown, tree data structure 310 corresponds to an object, but stores metadata that allows the data associated with the object to be located. The tree data structure corresponding to an object can be used to capture different versions of an object at different moments in time. In some embodiments, the tree data structure allows a chain of object metadata structures corresponding to different versions of an object to be linked together by allowing a node of a later version of an object metadata structure to reference a node of a previous version of an object metadata structure. The object metadata structure corresponding to a subsequent version of an object may be generated in part by cloning the metadata structure corresponding to a previous version of an object.

A root node or an intermediate node of a version of an object metadata structure may reference an intermediate node or a leaf node of a previous version of an object metadata structure. Similar to the snapshot tree, the object metadata structure allows different versions of an object to share nodes and allows changes to an object to be tracked. When a backup snapshot is received, a root node of the object metadata structure may be linked to one or more intermediate nodes associated with a previous object metadata structure. This may occur when data associated with an object is included in both backup snapshots.

In the example shown, tree data structure 310 includes a first object metadata structure comprising root node 302, intermediate nodes 312, 314, and leaf nodes 321, 322, 323, 324, 325, 326, 327, 328. Tree data structure 310 also includes a second object metadata structure that may be a snapshot of file data at a particular point in time, for example at time $t_1$. The second object metadata structure is comprised of root node 304, intermediate nodes 312, 314, and leaf nodes 321, 322, 323, 324, 325, 326, 327, 328. To create a snapshot of the file data at time $t_1$, a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the object metadata structure at a particular moment in time. The TreeID of a root node indicates a view with which the root node is associated (e.g., object version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing an object metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing an object metadata structure included in tree data structure 310 from root node 304 to intermediate node 314 leads to a leaf node with a data key of "5," "6," "7," or "8." Root node 304 includes a NodeID of "OR2" and a TreeID of "2."

Figure 3C:
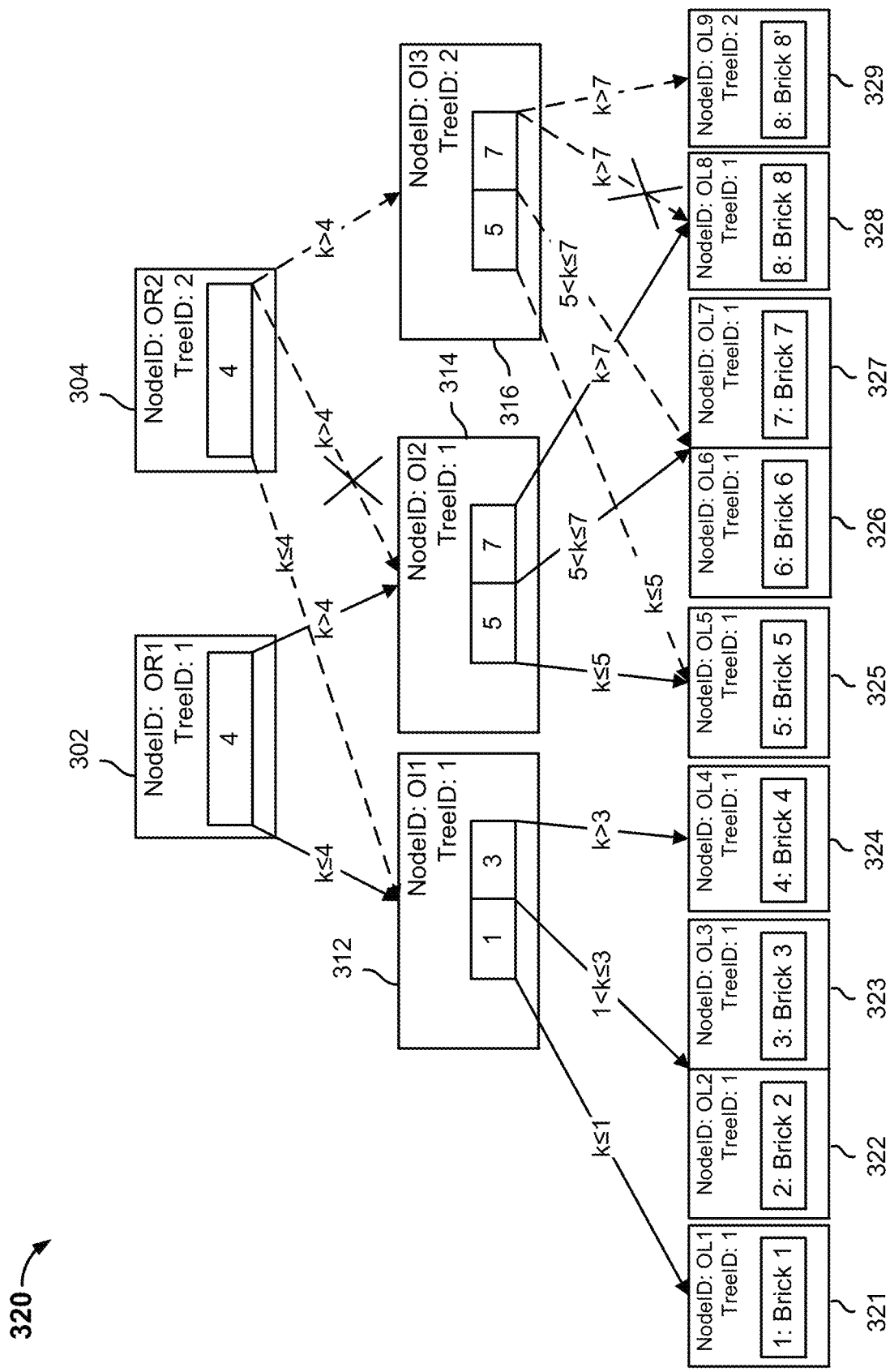
FIG. 3C is a block diagram illustrating an embodiment of modifying a cloned metadata structure.

FIG. 3C is a block diagram illustrating an embodiment of modifying a cloned metadata structure. Tree data structure 320 is comprised of a first object metadata structure that includes root node 302 and a second object metadata structure that includes root node 304. In the example shown, tree data structure 320 may be modified by a file system manager, such as file system manager 117. The modifications may correspond to modifications included in an incremental backup snapshot or a constructive incremental backup snapshot.

In some embodiments, the file data associated with an object may be modified such that one of the data chunks is replaced by another data chunk. When a data chunk of object data associated with a previous backup snapshot is replaced with a new data chunk, the data brick associated with the new data chunk may be different. A leaf node of an object metadata structure stores a brick identifier of a data brick that is associated with a data chunk. To represent this modification to the object data, a corresponding modification is made to a current view of an object metadata structure. The current view of the object metadata structure is modified because the previous object metadata structure is a snapshot view and can no longer be modified. The data chunk of the object data that was replaced has a corresponding leaf node in the previous object metadata structure. A new leaf node in the current view of the object metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 8'." At $t_1$, the file system manager starts at root node 304 because that is the root node associated with the object metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328.

Figure 3D:
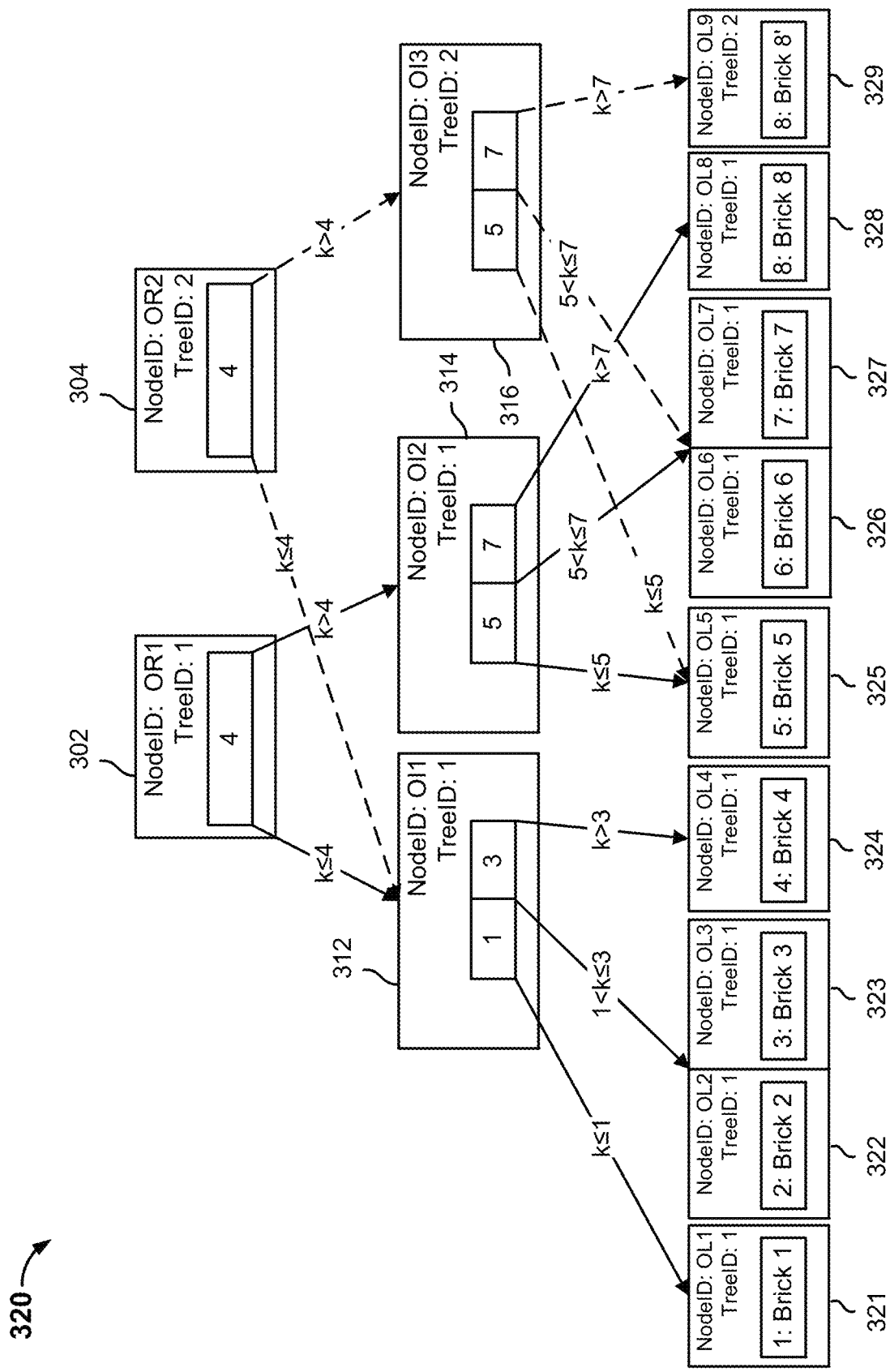
FIG. 3D is a block diagram illustrating an embodiment of a modified object metadata structure.

FIG. 3D is a block diagram illustrating an embodiment of a modified object metadata structure. The tree data structure 320 shown in FIG. 3D illustrates a result of the modifications made to tree data structure 320 as described with respect to FIG. 3C.

Figure 4A:
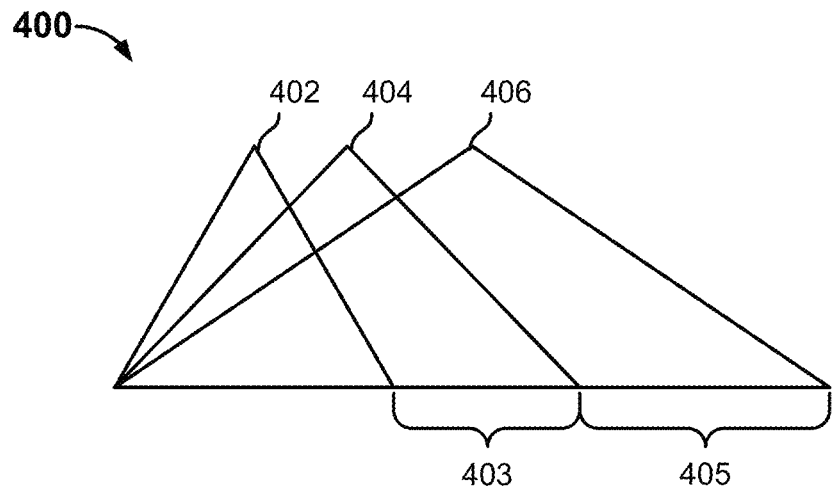
FIG. 4A is a diagram illustrating a tree data structure in accordance with some embodiments.

FIG. 4A is a diagram illustrating a tree data structure in accordance with some embodiments. In the example shown, tree data structure 400 includes a chain of snapshot trees 402, 404, 406. In some embodiments, tree data structure 400 includes a chain of object metadata structures 402, 404, 406. A backup system, such as backup system 112, may generate tree data structure 400 for data that is backed up from a restore target, such as restore target 102, to the backup system.

Snapshot tree 402 may correspond to a first backup snapshot that was performed at a first point in time (e.g., Monday). The first backup snapshot may correspond to a full backup snapshot or an incremental backup snapshot.

Snapshot tree 404 may correspond to a second backup snapshot that was performed at a second point in time (e.g., Tuesday). The second backup snapshot corresponds to an incremental backup snapshot. Snapshot tree 404 may be generated by cloning a root node of snapshot tree 402 and modifying snapshot tree 404 in a manner as described herein. Changes to the restore target that occurred after the first point in time are represented as change data 403.

Snapshot tree 406 may correspond to a third backup snapshot that was performed at a third point in time (e.g., Wednesday). The third backup snapshot corresponds to an incremental backup snapshot. Snapshot tree 406 may be generated by cloning a root node of snapshot tree 404 and modifying snapshot tree 406 in a manner as described herein. Changes to the restore target that occurred after the second point in time are represented as change data 405.

Figure 4B:
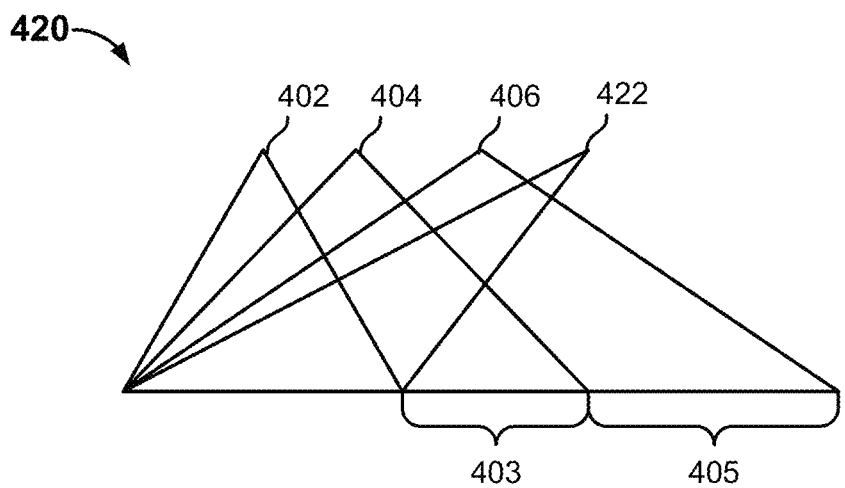
FIG. 4B is a diagram illustrating a tree data structure in accordance with some embodiments.

FIG. 4B is a diagram illustrating a tree data structure in accordance with some embodiments. In the example shown, tree data structure 420 includes a chain of snapshot trees 402, 404, 406, 422. In some embodiments, tree data structure 420 includes a chain of object metadata structures 402, 404, 406, 422.

At some point in time (e.g., Thursday), a restore target may go offline and need to be restored to a particular point in time. A backup system may receive a request to restore a specific backup instance to the restore target. The specific backup instance corresponds to a particular point in time. In this example, the specific backup instance corresponds to the first point in time (e.g., Monday). In response to receiving the request, the backup system may clone snapshot tree 402, i.e., the snapshot tree that corresponds to the first point in time, to generate snapshot tree 422 and restore data associated with snapshot tree 422 or data associated with snapshot tree 402 to the restore target.

Figure 4C:
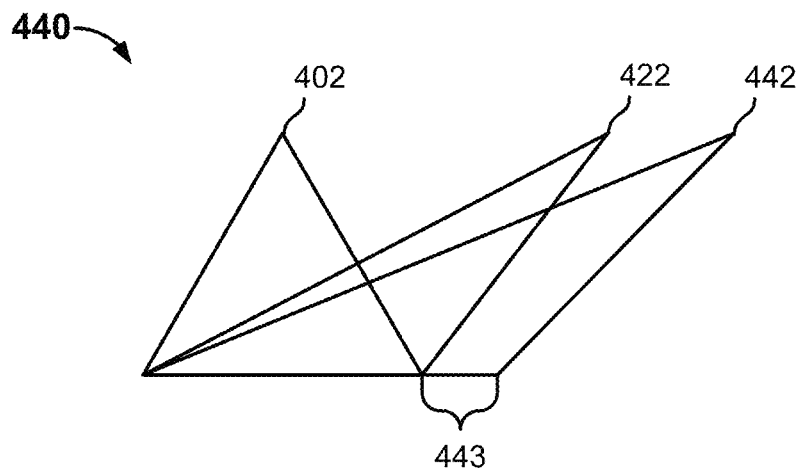
FIG. 4C is a diagram illustrating a tree data structure in accordance with some embodiments.

FIG. 4C is a diagram illustrating a tree data structure in accordance with some embodiments. In the example shown, tree data structure 440 includes a chain of snapshot trees 402, 422, 442. Snapshot trees 404, 406 may be included in tree data structure 440, but are not illustrated for explanation purposes.

In some embodiments, tree data structure 440 includes a chain of object metadata structures 402, 422, 442. Object metadata structure 404, 406 may be included in tree data structure 440, but are not illustrated for explanation purposes.

A restore target may perform a constructive incremental backup snapshot after the data associated with snapshot tree 422 is restored. The restore target may include a change tracker. A change tracker may be configured to track the data blocks that have changed since a checkpoint, which may correspond to a previous backup snapshot. The backup system may send to the change tracker a command to create a tracking ID. Instead of performing an incremental backup snapshot by sending to the backup system the data that has changed since a previous backup snapshot, the restore target may perform a constructive incremental backup snapshot and send to the backup system the data that has changed since the tracking ID was created. This changed data is represented as change data 443.

This is an efficient backup after a restore operation because the amount of data that is backed up to the backup system is limited to the data that has changed since the restore operation. Other incremental backups may include data that has changed after the last backup snapshot and before the restore operation. For example, other systems may perform an incremental backup that includes change data 443 and the change data that occurred after the third point in time, but before the data associated with snapshot tree 442 is restored.

Figure 5:
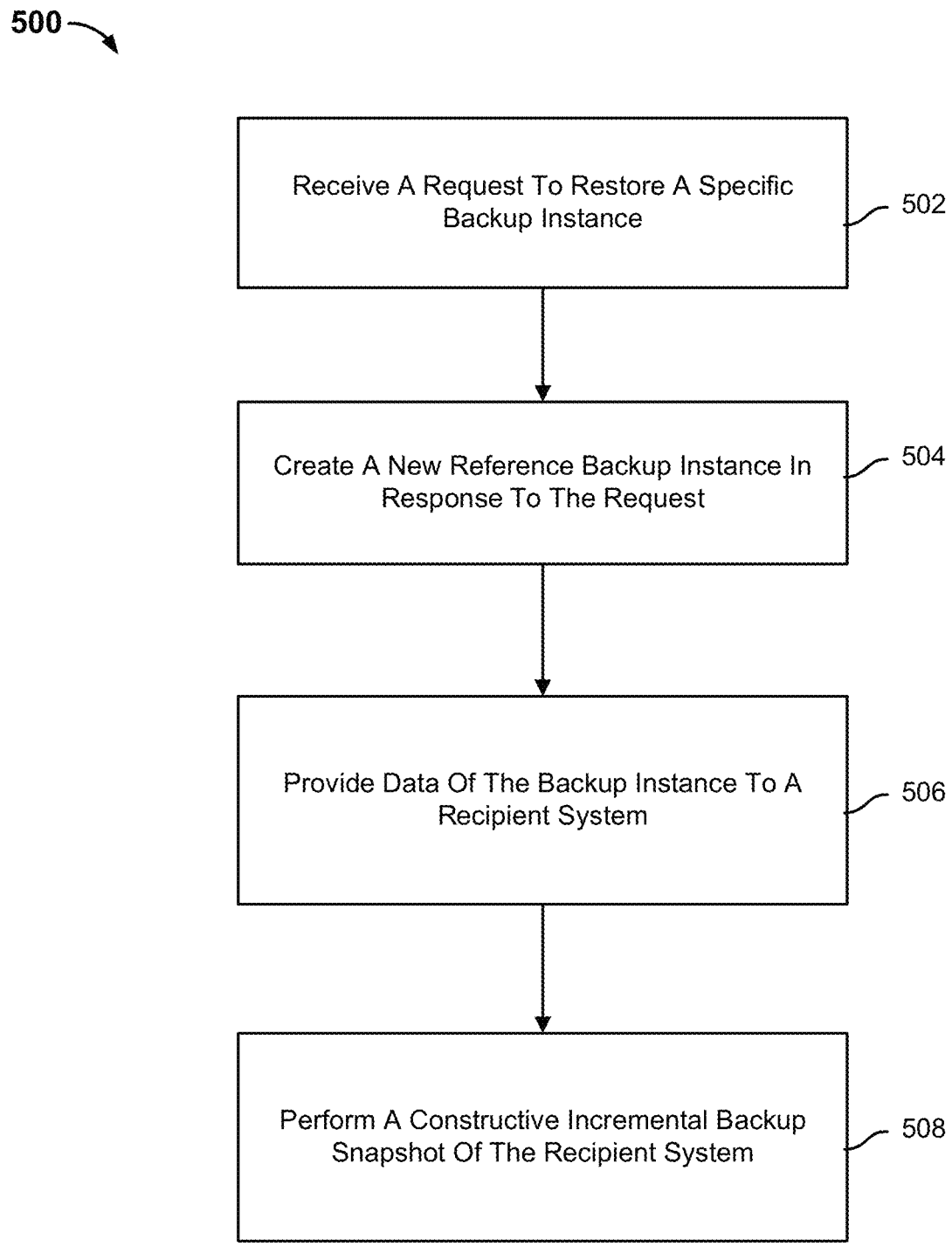
FIG. 5 is a flow diagram illustrating an embodiment of a process for performing an efficient backup after a restore operation in accordance with some embodiments.

FIG. 5 is a flow diagram illustrating an embodiment of a process for performing an efficient backup after a restore operation in accordance with some embodiments. In the example shown, process 500 may be implemented by a backup system, such as backup system 112.

At 502, a request to restore a specific backup instance is received. The request may be received from a user associated with a recipient system via the user's device. In some embodiments, the request is received from the recipient system. In some embodiments, the request is received from a cloud portal or management system associated with a recipient system and/or backup system. In some embodiments, the request is received at a user interface associated with the backup system.

In some embodiments, the request is to restore the entire recipient system to a particular point in time for which there is an associated backup snapshot. In some embodiments, the request is to restore to the recipient system an object associated with the particular point in time for which there is an associated backup snapshot. The object may correspond to a file, a database, a virtual machine, an application, a volume, etc.

At 504, a new reference backup instance is created in response to the request. The new reference backup instance may be created at a storage associated with a backup system based on the specific backup instance stored at a storage associated with the backup system. The new reference backup instance may be created by cloning a root node of a snapshot tree associated with the specific backup instance. The snapshot tree may be included in a tree data structure that is comprised of one or more snapshot trees. Cloning the root node of the snapshot tree associated with the specific backup instance may add an additional view to the chain of snapshot trees included in the tree data structure.

At 506, data of the backup instance is provided to a recipient system from a storage associated with a backup system. A backup system may traverse a snapshot tree to locate the data of the backup instance. In some embodiments, the backup system traverses the snapshot tree associated with the specific backup instance to locate the data of the backup instance. In some embodiments, the backup system traverses the snapshot tree associated with the new reference backup instance to locate the data of the backup instance.

In response to receiving the data associated with the backup instance, the recipient system may store in one or more storage volumes the data associated with the backup instance to restore the recipient system to the particular point in time. Subsequently, the recipient system may modify the object metadata associated with the backup instance. For example, a virtual machine name may be modified, attributes associated with one or more objects may be customized, one or more tags may be applied to a virtual machine, etc.

The recipient system may include a change tracker. The backup system may send to the recipient system a command to create a new tracking ID. The recipient system may provide the command to the change tracker, which creates the new tracking ID. The new tracking ID indicates a checkpoint from which a constructive incremental backup snapshot should be performed. A tracker ID created after data is restored can be used to create an incremental backup that captures changes made since the primary system was restored and excludes other changes, such as changes made after the last backup snapshot and before the primary system was restored.

At 508, a constructive incremental backup snapshot of the recipient system is performed based on the new reference backup instance. In some embodiments, the backup system sends to the recipient system a request to perform a backup snapshot based on the new tracking ID. The backup system may receive from the recipient system the data associated with the constructive incremental backup snapshot. To generate a view of file system data that represents a state of the recipient system for a particular point in time at which the constructive incremental backup snapshot was performed, the backup system may clone a root node of the snapshot tree that corresponds to the new reference backup instance and modify the snapshot tree and any associated object metadata structures in a manner as described herein to reflect the state of the recipient system for the particular point in time at which the constructive incremental backup snapshot was performed.

Figure 6:
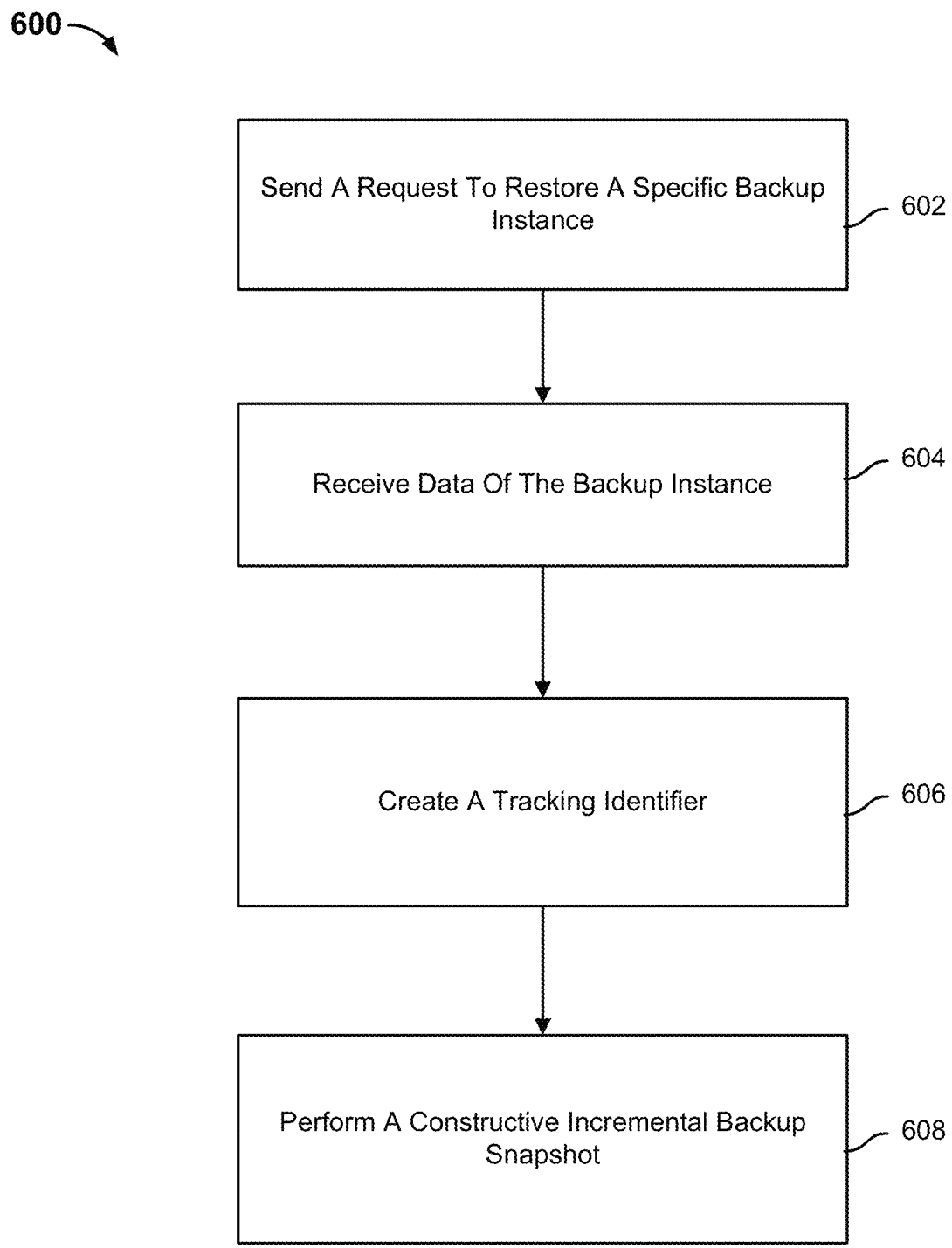
FIG. 6 is a flow diagram illustrating an embodiment of a process for performing an efficient backup after a restore operation in accordance with some embodiments.

FIG. 6 is a flow diagram illustrating an embodiment of a process for performing an efficient backup after a restore operation in accordance with some embodiments. In the example shown, process 600 may be implemented by a system, such as restore target 102.

At 602, a request to restore a specific backup instance is sent. A recipient system may become corrupted and need to be restored to a particular point in time. For example, a volume of the recipient system may become corrupted. In some embodiments, the request is to restore the entire recipient system to a particular point in time for which there is an associated backup snapshot. In some embodiments, the request is to restore to the recipient system one or more objects associated with the particular point in time for which there is an associated backup snapshot. For example, the request may be to restore a particular version of a VM to the restore target. The request may be to restore a particular database and associated database files to the restore target.

In some embodiments, 602 is optional. For example, as described with respect to step 502, the request may be received from a user associated with a recipient system via the user's device, a cloud portal or management system associated with a recipient system and/or a backup system, a user interface associated with the backup system, etc.

At 604, data associated with the specific backup instance is received. In some embodiments, the data associated with the specific backup instance includes file system data to restore the entire recipient system to a particular point. In some embodiments, the data associated with the specific backup instance includes file system data to restore an object associated with the particular point in time for which there is an associated backup snapshot.

In some embodiments, the recipient system modifies object metadata associated with an object after receiving the data associated with the specific backup instance. For example, a virtual machine name may be modified, attributes associated with one or more objects may be customized, one or more tags may be applied to a virtual machine, etc.

At 606, a tracking identifier is created. The tracking ID indicates a checkpoint from which an incremental backup snapshot should be performed. The recipient system may be configured to perform an incremental backup snapshot based on the tracking ID associated with a previous backup snapshot, but in the event a new tracking ID is created, the recipient system may be configured to perform a constructive incremental backup snapshot based on changed data that occurred after a timestamp associated with the tracking ID instead of based on changed data that occurred since a tracking ID associated with a previous backup snapshot. The recipient system may send the tracking ID to the backup system.

At 608, a constructive incremental backup snapshot is performed. The recipient system may perform a backup snapshot after the data associated with the backup instance is restored. In some embodiments, the recipient system may perform the backup snapshot according to a schedule (e.g., everyday at 12 am). The recipient system may be configured to perform the backup snapshot based on a last created tracking ID. The recipient system may receive from the backup system a request to perform a constructive incremental backup based on a tracking ID. Instead of performing an incremental backup snapshot based on a tracking ID associated with a previous backup snapshot, the recipient system may perform a constructive incremental backup snapshot based on the tracking ID created at 606 and send to the backup system the data that has changed since the tracking ID was created.

This is an efficient backup after a restore operation because the amount of data that is backed up to the backup system is limited to the data that has changed since the restore operation. Other incremental backups may include data that has changed after the last backup snapshot and before the restore operation. Furthermore, a full backup snapshot of the recipient system does not need to be performed after the restore operation because the backup system already stores most of the data that is to be included in the full backup snapshot of the recipient system. Thus, the amount of resources needed by the recipient system to perform a backup snapshot after a restore operation is reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method, comprising:
    receiving, by a computing system, a request to restore a specific backup instance of a volume of a recipient system to the recipient system;
    tracking, by the computing system and at the recipient system, changes that have occurred to the volume of the recipient system since a previous backup snapshot, wherein the previous backup snapshot occurred at a first point in time;
    restoring, by the computing system, data associated with the specific backup instance to the recipient system from the computing system at a second point in time; and
    performing, by the computing system, a constructive incremental backup snapshot by excluding a first set of one or more changes that occurred at the recipient system between the first point in time associated with the previous backup snapshot and the second point in time associated with the specific backup instance being restored to the recipient system and including a second set of one or more changes that occurred at the recipient system after the second point in time associated with the data associated with the specific backup instance being restored to the recipient system.

2. The method of claim 1, wherein the specific backup instance corresponds to an entire volume of the recipient system.

3. The method of claim 1, wherein the specific backup instance is associated with an object that was backed up from the recipient system to the computing system.

4. The method of claim 3, wherein the object is a virtual machine.

5. The method of claim 1, further comprising, in response to the received request to restore the specific backup instance, creating, by the computing system, a new reference backup instance includes cloning a root node of a tree structure associated with the specific backup instance to create a snapshot tree that corresponds to the new reference backup instance.

6. The method of claim 5, wherein restoring the data associated with the specific backup instance includes traversing, by the computing system, the snapshot tree that corresponds to the new reference backup instance to locate the data associated with the specific backup instance.

7. The method of claim 6, wherein performing the constructive incremental backup snapshot of the recipient system includes cloning, by the computing system, a root node of the snapshot tree that corresponds to the new reference backup instance to create a snapshot tree that corresponds to the constructive incremental backup snapshot of the recipient system.

8. The method of claim 1, further comprising causing, by the computing system, the recipient system to generate a new tracking identifier corresponding to a state of the recipient system at the second point in time after restoring the data associated with the specific backup instance.

9. The method of claim 8, further comprising setting, by the computing system, the data associated with the specific backup instance to a mutable state after the new tracking identifier is generated.

10. A computing system, comprising:
a memory storing instructions; and
processing circuitry that executes the instructions to:
receive a request to restore a specific backup instance of a volume of a recipient system to the recipient system;
track, at the recipient system, changes that have occurred to the volume of the recipient system since a previous backup snapshot, wherein the previous backup snapshot occurred at a first point in time;
restore data associated with the specific backup instance to the recipient system from the computing system at a second point in time; and
perform a constructive incremental backup snapshot by excluding a first set of one or more changes that occurred at the recipient system between the first point in time associated with the previous backup snapshot and the second point in time associated with the specific backup instance being restored to the recipient system and including a second set of one or more changes that occurred at the recipient system after the second point in time associated with the data associated with the specific backup instance being restored to the recipient system.

11. The computing system of claim 10, wherein the specific backup instance corresponds to an entire volume of the recipient system.

12. The computing system of claim 10, wherein the specific backup instance is associated with an object that was backed up from the recipient system to the computing system.

13. The computing system of claim 12, wherein the object is a virtual machine.

14. The computing system of claim 10, wherein the processing circuitry further executes the instructions to, in response to the received request to restore the specific backup instance, create a new reference backup instance includes cloning a root node of a tree structure associated with the specific backup instance to create a snapshot tree that corresponds to the new reference backup instance.

15. The computing system of claim 14, wherein to restore the data associated with the specific backup instance the processing circuitry further executes the instructions to traverse the snapshot tree that corresponds to the new reference backup instance to locate the data associated with the specific backup instance.

16. The computing system of claim 15, wherein to perform the constructive incremental backup snapshot of the recipient system wherein the processing circuitry further executes the instructions to clone a root node of the snapshot tree that corresponds to the new reference backup instance to create a snapshot tree that corresponds to the constructive incremental backup snapshot of the recipient system.

17. The computing system of claim 10, wherein the processing circuitry further executes the instructions to cause the recipient system to generate a new tracking identifier corresponding to a state of the recipient system at the second point in time after restoring the data associated with the specific backup instance.

18. The computing system of claim 17, wherein the processing circuitry further executes the instructions to set the data associated with the specific backup instance to a mutable state after the new tracking identifier is generated.

19. Non-transitory computer-readable storage media comprising instructions that, when executed, cause processing circuitry of a computing system to:
receive a request to restore a specific backup instance of a volume of a recipient system to the recipient system;
track, at the recipient system, changes that have occurred to the volume of the recipient system since a previous backup snapshot, wherein the previous backup snapshot occurred at a first point in time;
restore data associated with the specific backup instance to the recipient system from the computing system at a second point in time; and
perform a constructive incremental backup snapshot by excluding a first set of one or more changes that occurred at the recipient system between the first point in time associated with the previous backup snapshot and the second point in time associated with the specific backup instance being restored to the recipient system and including a second set of one or more changes that occurred at the recipient system after the second point in time associated with the data associated with the specific backup instance being restored to the recipient system.

20. The non-transitory computer-readable storage media of claim 19, wherein the instructions, when executed, cause the processing circuitry to cause the recipient system to generate a new tracking identifier corresponding to a state of the recipient system at the second point in time after restoring the data associated with the specific backup instance.

* * * * *